Patented Mar. 21, 1939

2,151,106

UNITED STATES PATENT OFFICE 2,151,106

PRODUCTION OF HIGHER MOLECULAR ALCOHOLS

Winfrid Hentrich, Dusseldorf-Reisholz, and Carl Albert Lainau and Wilhelm Jakob Kaiser, Dusseldorf, Germany; Adolf Bartholomaus, administrator of said Carl Albert Lainau, deceased, assignors to Henkel & Cie. G. m. b. H., Dusseldorf-Holthausen, Germany No Drawing. Application February 23, 1937, Serial No. 127,168. In Germany February 17, 1936

5 Claims. (Cl. 260—451)

This invention relates to the production of higher molecular alcohols and more particularly to the production of mixtures of higher molecular alcohols having about 8 or more carbon atoms in the molecule from synthetically prepared raw materials.

Mixtures of higher molecular alcohols containing for the most part those having from 8 to 18 carbon atoms, such as $C_8H_{17}OH$ to $C_{18}H_{37}OH$, in their unreacted form and as well in the form of their derivatives, constitute valuable agents for many varied purposes in the textile finishing, leather and paper industries. Up to the present time, the alcohols of this nature have been obtained by the reduction of naturally occurring fatty materials, that is, esters and acids, through the action of hydrogen in the presence of hydrogenation catalysts. For obtaining such alcohols industry therefore is dependent for its raw materials upon substances which for the most part must be imported from foreign countries. All efforts to obtain the alcohols from substances other than fatty acid compounds have not been satisfactory, either because of the presence of large quantities of impurities which are very difficult or even impossible to remove, or because of the extremely high cost of production.

An object of the present invention is to produce higher molecular alcohols from domestic raw materials which can be synthetically prepared, thereby avoiding the necessity and expense for reliance upon imported materials which are hampered by tariffs and may be stopped altogether in the advent of war.

Broadly considered, the present invention involves a process wherein higher molecular alcohols are produced from synthetically prepared raw materials by reacting carbon monoxide and hydrogen to produce hydrocarbons, in a manner which is the same or similar to that process used in the synthetic production of benzine, oxidizing a liquid-solid mixture of hydrocarbons having 8 or more carbon atoms obtained from the hydrocarbon mixture to produce acid oxidation products primarily and then reducing the said oxidation products to alcohols whereby a mixture of higher molecular fatty alcohols is obtained having about 8 or more carbon atoms.

In accordance with the first step of the process, a mixture of higher molecular hydrocarbons is obtained by a process involving the action of hydrogen upon carbon monoxide under conditions such as are ordinarily employed in the synthetic production of benzine. Satisfactory conditions of preparation are disclosed by the work of Fr. Fischer as recorded in "Brennstoff-Chemie", 1928, page 21, as well as in 1932, page 461 et seq. In this benzine synthesis process, a large portion of the reaction products possess a molecular weight higher than the benzine and hence is not suitable as a motor fuel for the normal internal combustion engine. This higher molecular fraction is of a liquid-solid nature and possesses for the most part from about 8 to 18 carbon atoms. This liquid-solid mixture is generally considered as a waste product for not only is it unsuitable as a motor fuel but it is also not suitable for lubrication purposes, for it possesses an unacceptable viscosity and little power of lubrication.

After considerable experimentation, the applicants hereto have discovered that this liquid-solid mixture of hydrocarbons after separation of the lower molecular hydrocarbons having about 6 or less carbon atoms can be treated to produce a corresponding mixture of higher molecular alcohols with unexpectedly satisfactory results, as is hereinafter pointed out.

This liquid-solid mixture of hydrocarbons having primarily from about 8 to 18 carbon atoms in accordance with the second step of the process is subjected to an oxidation treatment, the general nature of which is already known in the art. This oxidation treatment changes these hydrocarbons into a reaction product consisting for the most part of acids and their derivatives such as esters and lactones, which products are hereinafter collectively referred to as "acid oxidation products".

In accordance with the third step of the instant process, these acid oxidation products are reduced to alcohols. This reduction may be accomplished most satisfactorily by treating the said products at elevated temperatures and pressures in the presence of hydrogen and a hydrogenation catalyst. Other methods of reduction may be employed but they are not as satisfactory. For example, they may be reduced by the action of alkali metals and lower molecular alcohols in accordance with the process of Bouveault and Blanc wherein substantially only the esters of the acids are reduced.

The oxidation step of the present process is carried out by oxidizing the above mentioned liquid-solid mixture of hydrocarbons by a treatment with oxygen itself, oxygen-containing gases as air, or compounds which liberate oxygen, such as ozone, nitric oxides, nitric acid or chromic acid wherein the hydrocarbons may be either in liquid phase or in vapor phase. The oxidizing action may be satisfactorily effected either in the absence or in the presence of catalysts such as the heavy metals or their salts, as manganese, nickel, cobalt, copper, chromium or lead and vanadium. The reaction also may be carried out in the presence or absence of alkalis, alkaline earths or their salts. These catalytic metals may be employed in the form of their fatty acid derivatives or soaps, as may be produced by neutralization of saturated or unsaturated fatty acids such as naphthenic acids and the resinic acids, which compounds form a colloidal solution with the hydrocarbon mixture treated.

Before the reduction step of the process is carried out, it is desirable but not necessary to subject the oxidation products to a distillation, cooling, selective solvent or other treatment whereby the alcohols and/or the non-oxidized portions thereof are separated out. Furthermore, the acid oxidation products may be separated from each other if it is desired to treat any particular fraction in a more concentrated form.

The acid oxidation products may be reduced to the fatty alcohol stage by processes already known to the art. For example, reduction may be carried out satisfactorily by treating the acid oxidation products with hydrogen at elevated temperatures of from about 200–350° C. under high pressures of 50–300 atmospheres in the presence of suitable hydrogenation catalysts such as nickel, copper, cobalt, chromium or mixed catalysts prepared from these metals or in the presence of noble metals. The fraction of said hydrocarbons consisting primarily in esters may alternatively be reduced by the action of an alkali metal, particularly sodium, in the presence of ethyl or other lower molecular alcohol.

Example 1

A liquid-solid mixture of hydrocarbons obtained by the reaction of carbon monoxide and hydrogen in a process not unlike that disclosed by Fr. Fischer for the production of synthetic benzine is oxidized by blowing a stream of air therethrough in the presence of a catalyst composed of a manganese soap at a temperature of 100–150° C. Three hundred parts by weight of the acid oxidation products (having a boiling point at 4 mm. at 140–230° C.) after having been freed of the non-oxidized materials is treated with hydrogen at a temperature of 250–300° C. during stirring under a pressure of 200–250 atmospheres in the presence of a copper-chromite catalyst. Upon completion of the reduction to the alcohol stage, the reaction products are separated from the catalyst, such reaction products constituting a mixture of higher fatty alcohols which, if desirable or necessary, may be purified by means of vacuum distillation. Through this purification, a very satisfactory fraction may be obtained having a boiling range at 12 mm. of from 110–270° C. and a hydroxyl number of 248. The product possesses a snow white color and is a solid at ordinary room temperatures.

Example 2

The oxidation mixture described in Example 1 is esterified in known manner with butyl alcohol. Three hundred parts by weight of this product having a boiling range at 2 mm. of 125–240° C. is hydrogenated under the same conditions as set out in Example 1. The mixture of higher fatty alcohols obtained upon the separation of the catalyst by filtration is completely colorless and need not be distilled. It also is a solid at ordinary room temperatures.

Example 3

Four hundred parts by weight of an oxidation product obtained by the treatment of the herein mentioned liquid-solid portion of hydrocarbons derived in a synthetic benzine process, which product boils at a temperature above 130° C. at a pressure of 14 mm. and which has not been purified by distillation, is reduced in accordance with the procedure described in Example 1. Upon separation of the catalyst, a mixture of higher molecular or fatty alcohols is obtained which distills at a temperature of 90° C. at 14 mm. of pressure to 280° C. at 3 mm. pressure. This product possesses the hydroxyl number of 260, is pure white and is solid at room temperature.

The instant process of producing higher molecular alcohols possesses certain outstanding advantages over those processes heretofore employed. The reduction step of the instant process is extremely simple and proceeds very smoothly for it does not require special precautionary measures. This outstanding advantage results from the fact that the oxidation products are free of catalytic poisons, in particular sulfur.

The mixtures of the higher fatty alcohols obtained in accordance with the present invention are very similar in many respects to the mixtures of the higher molecular alcohols obtained in accordance with the processes of the prior art wherein the same are produced by the reduction of natural fats and waxes. The alcohols obtained by the instant process therefore are suitable for the many and varied purposes for which the alcohols produced by known processes are used or proposed for use in the patent and other literature as for softening, plasticizing, and smoothing. They are also suitable for the preparation of valuable derivatives such as the sulfonation products. The sulfuric acid esters and sulfonates of the new mixtures of alcohols may be very satisfactorily used in the textile, leather and paper industries in the same manner that the equivalent derivatives now on the market may be used.

It should be understood that the present invention is not limited to the specific examples given herein, but that it extends to all equivalent procedures and conditions which may fairly be considered within the scope of the appended claims.

We claim:
1. The process of producing higher molecular alcohols from synthetically prepared raw materials which comprises reacting carbon monoxide and hydrogen to produce hydrocarbons, subjecting a fraction of said hydrocarbons containing 8 or more carbon atoms in the molecule to oxidation conditions adapted to produce oxidation products consisting primarily of acid oxidation products of said hydrocarbons, reducing the oxidation products thereby forming higher molecular alcohols having about 8 or more carbon atoms.

2. The process of producing higher molecular alcohols from synthetically prepared raw materials which comprises reacting carbon monoxide and hydrogen to produce hydrocarbons, separating off the lower molecular hydrocarbons of about 6 or less carbon atoms in the molecule from the liquid-solid mixture of hydrocarbons containing about 8 or more carbon atoms in the molecule, oxidizing the latter mixture of hydrocarbons to form acid oxidation products primarily, and reducing the resulting mixture of oxidation products to the alcohol stage whereby mixtures of higher molecular alcohols are obtained.

3. In the production of higher molecular alcohols from synthetically prepared raw materials, the steps which comprise subjecting a liquid-solid mixture of hydrocarbons having 8 to 18 carbon atoms separated from a synthetically prepared benzine mixture obtained by the reaction of carbon monoxide and hydrogen, to the action of air under conditions producing primarily acid oxidation products of said hydrocarbons, then reducing said acid oxidation products to the alcohol stage, whereby mixtures of alcohols are obtained.

4. The process of producing higher molecular alcohols from synthetically prepared materials which comprises subjecting a liquid-solid mixture of hydrocarbons having 8 or more carbon atoms obtained synthetically by the reaction of carbon monoxide and hydrogen to the action of air whereby acid oxidation products for the most part are produced, subjecting said acid oxidation products to the action of hydrogen and a hydrogenation catalyst at an elevated temperature and pressure until the same are reduced to the alcohol stage, whereby a mixture of higher molecular alcohols is obtained.

5. The process of producing a mixture of higher molecular alcohols from synthetically prepared raw materials which comprises, oxidizing to the acid stage the liquid-solid mixture of hydrocarbons having about 8 or more carbon atoms obtained as a waste product in the synthesis of benzine from carbon monoxide and hydrogen and reducing the resulting acid oxidation products to alcohols.

WINFRID HENTRICH.
CARL ALBERT LAINAU.
WILHELM JAKOB KAISER.